(12) United States Patent　(10) Patent No.:　US 6,330,151 B1
Bates, III　(45) Date of Patent:　Dec. 11, 2001

(54) ELECTRONIC DEVICE WITH RETRACTABLE TRAY

(75) Inventor: Charles Linsday Bates, III, Laguna Hills, CA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 24 days.

(21) Appl. No.: 09/583,163

(22) Filed: May 30, 2000

(51) Int. Cl.[7] .................................................... H05K 5/00
(52) U.S. Cl. .................... 361/686; 361/725; 361/759; D6/396
(58) Field of Search .................... 361/683, 726, 361/684–686, 724–725, 740, 759; D6/396, 397; D14/100, 114

(56) References Cited

U.S. PATENT DOCUMENTS

| | | | |
|---|---|---|---|
| 4,582,985 | 4/1986 | Lofberg | 235/380 |
| 5,180,901 | 1/1993 | Hiramatsu | 235/380 |
| 5,183,404 | 2/1993 | Aldous et al. | 439/55 |
| 5,336,099 | 8/1994 | Aldous et al. | 439/131 |
| 5,338,210 | 8/1994 | Beckham et al. | 439/131 |
| 5,411,405 | 5/1995 | McDaniels et al. | 439/131 |
| 5,463,261 | 10/1995 | Skarda et al. | 307/131 |
| 5,547,401 | 8/1996 | Aldous et al. | 439/676 |
| 5,623,552 | 4/1997 | Lane | 382/124 |
| 5,727,972 | 3/1998 | Aldous et al. | 439/655 |
| 5,773,332 | 6/1998 | Glad | 439/344 |
| 5,815,252 | 9/1998 | Price-Francis | 356/71 |
| 5,971,777 | 10/1999 | Garside | 439/131 |
| 5,975,927 | 11/1999 | Giles | 439/131 |
| 5,989,042 | 11/1999 | Johnson et al. | 439/131 |
| 6,000,957 | 12/1999 | Betker et al. | 439/131 |
| 6,012,636 | 1/2000 | Smith | 235/380 |
| 6,101,088 * | 8/2000 | Nakajima et al. | 361/686 |

* cited by examiner

Primary Examiner—Gerald Tolin
Assistant Examiner—Hung Van Duong
(74) Attorney, Agent, or Firm—Roger C. Turner

(57) ABSTRACT

An electronic device (10) such as an IC card, has a tray (14) with a component (20) such as a fingerprint sensor, where the tray can move out beyond the rear end of the device and back into the device with a double click mechanism (34), in a simple and rugged configuration. The tray is slideably guided by a tray guide (50) that is mounted on the housing of the device, with a spring (36) urging the tray rearwardly from a stowed position (14) to a deployed position (14A). The double click mechanism that holds the tray in its stowed position, includes a cam element (70) and a cam follower element (72), with one element integrally molded with the tray and the other element integrally molded with the tray guide. The tray has a forwardly-extending arm (112) that holds the front end of the tension spring, while the rear end of the tension spring is mounted on the tray guide. The tension spring is located in an isolated area (150) between one side (110) of the tray guide and a side (146) of the housing of the electronic device. An electrical connecting arrangement (22) that couples the component on the slideable tray to a fixed mother board (24), includes a flat flexible cable (166) with a 180° bend (174) about a horizontal axis (176), and with upper and lower cable parts (170, 172) each lying in a horizontal plane.

15 Claims, 5 Drawing Sheets

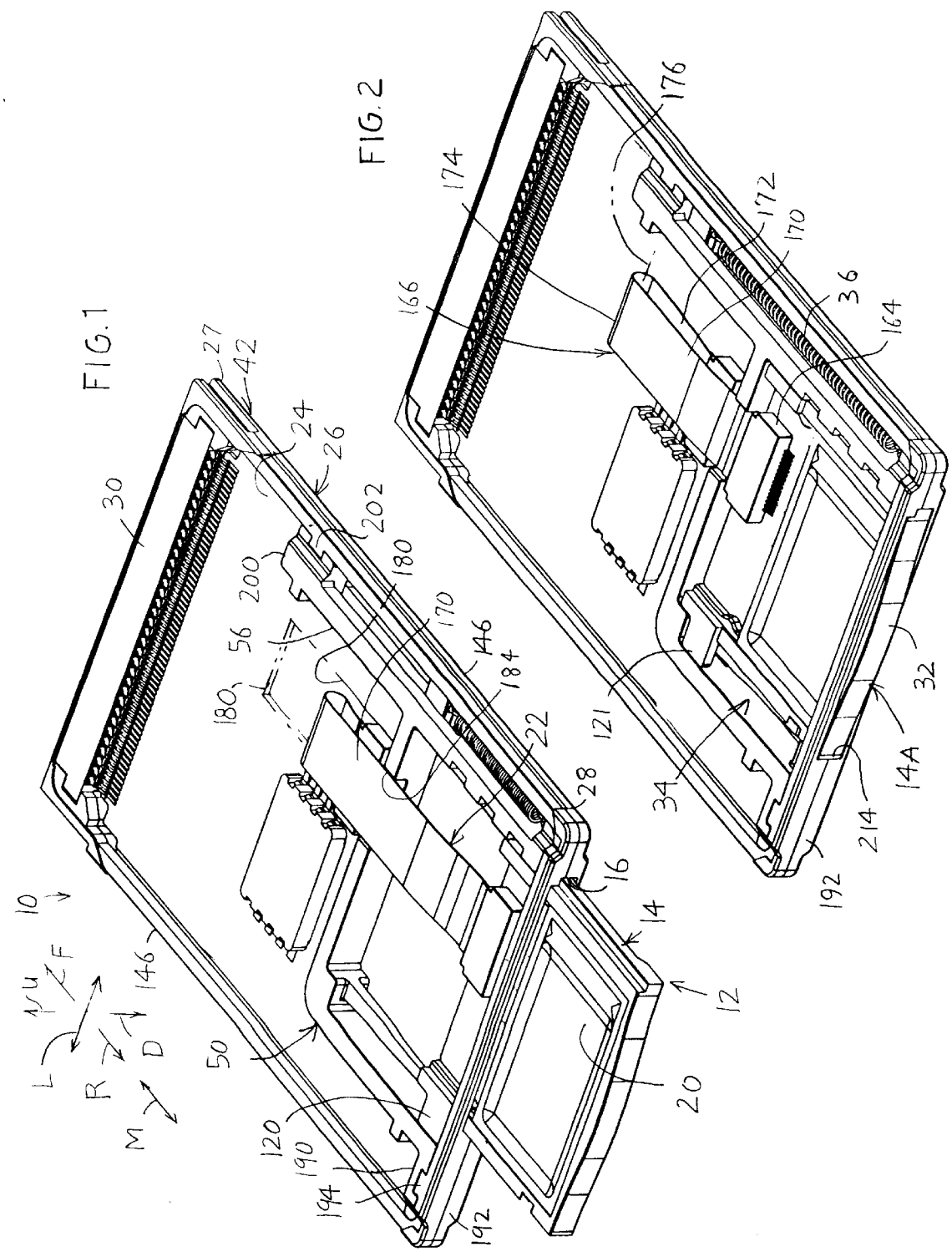

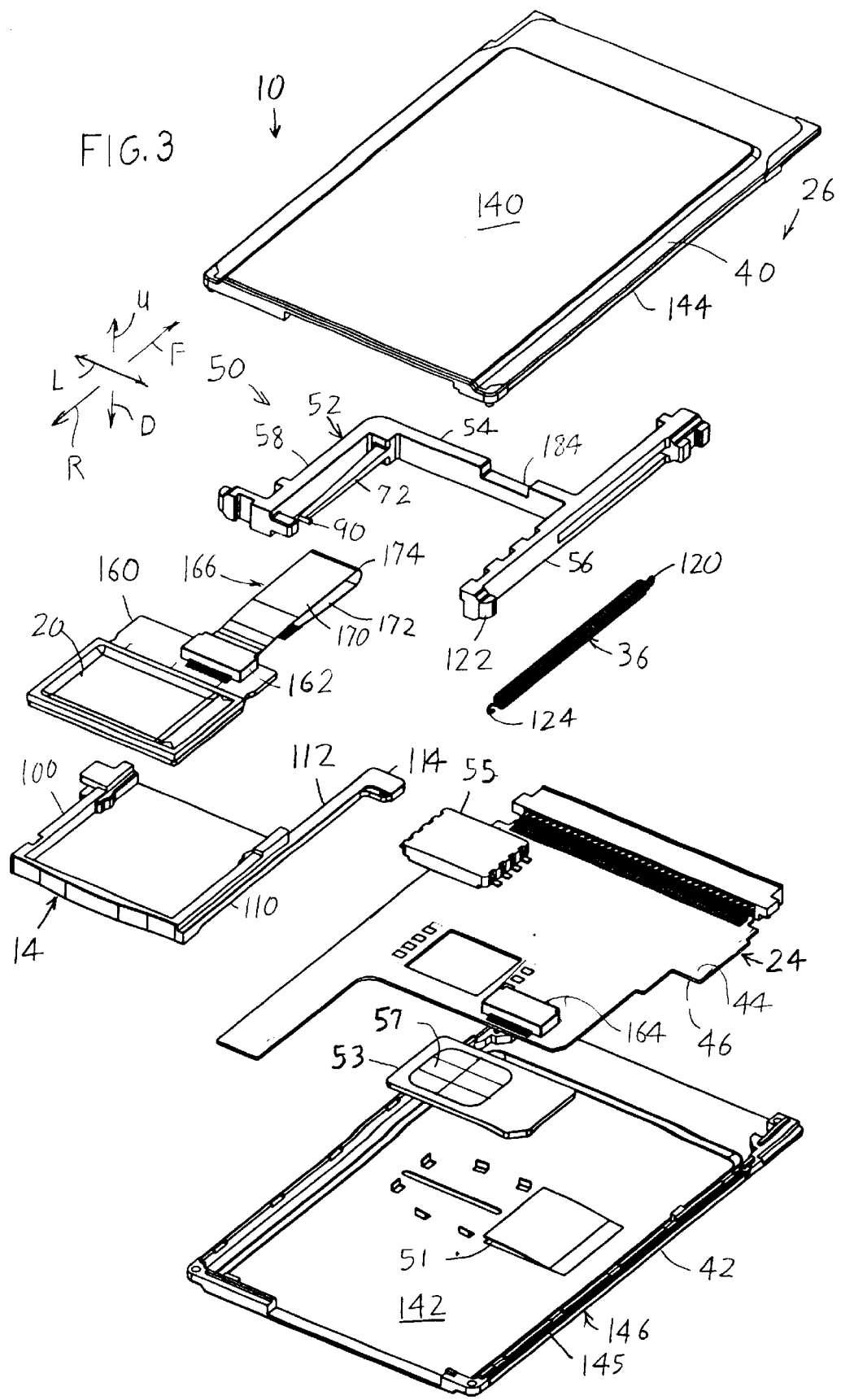

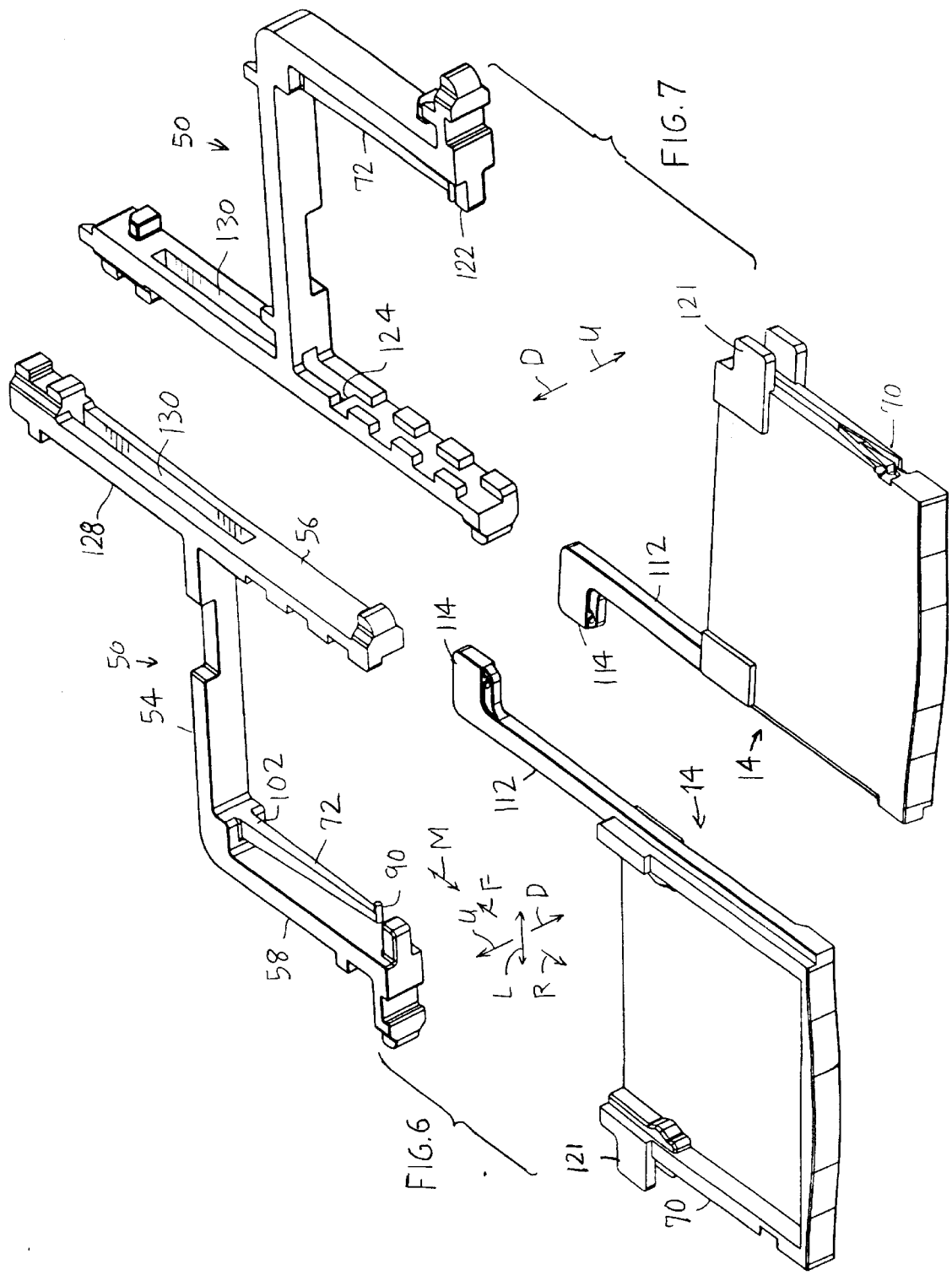

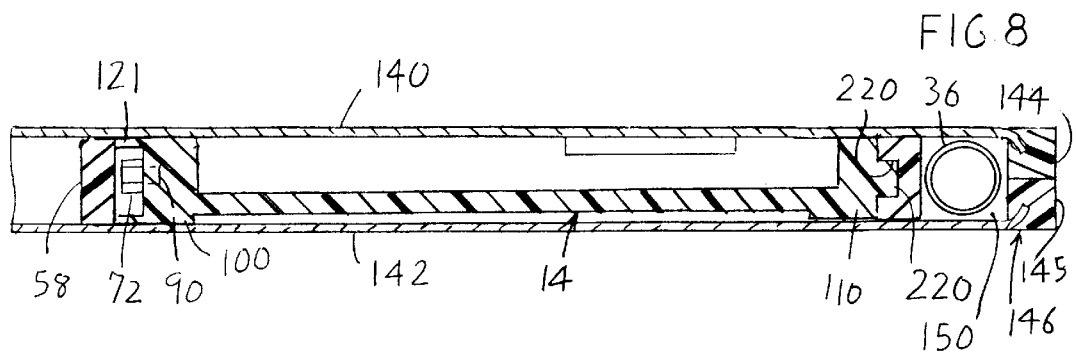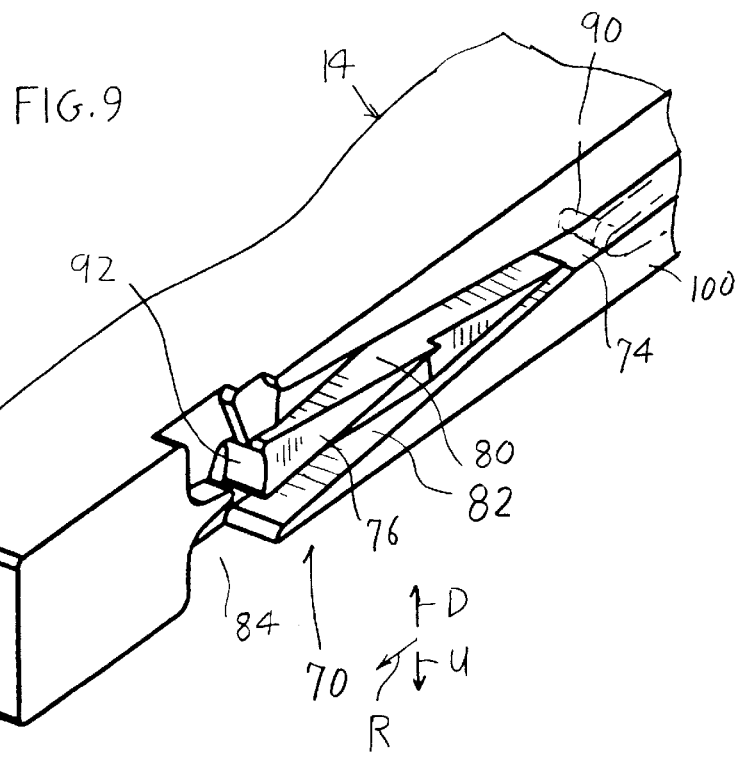

ELECTRONIC DEVICE WITH RETRACTABLE TRAY

BACKGROUND OF THE INVENTION

Retractable trays have been incorporated in several types of electronic devices, such as IC cards, cell phones and PDA (personal digital assistants). The retractable tray holds a component such as a fingerprint sensor or telephone jack connector that is concealed and protected when the tray is stowed, and easily accessible when the tray is deployed. The tray can be deployed from its stowed position by pulling out the tray or moving an actuator along the slot, etc., but it is often difficult to grasp the tray to pull it or to operate an actuator. Automatic deployment devices such as a double click mechanism that pushes out the tray when the tray is pushed in a second time, is generally desirable. However, such mechanism has required additional parts which increase the complexity of the tray assembly. When the tray must be contained within an electronic device of very small height, such as a Type II PCMCIA standard IC card, which has a maximum thickness of 5 mm (millimeters), this can lead to a mechanism that is expensive to make and assemble and which is easily broken. A tray assembly for an electronic device, which had a minimum number of parts, which was rugged, and which enabled easy tray deployment as with a double click mechanism, would be of value.

SUMMARY OF THE INVENTION

In accordance with one embodiment of the present invention, an electronic device is provided with a tray assembly that includes a tray that holds a component to move it into the housing of the electronic device when the tray is stowed, and to move it out of the electronic device when the tray is deployed, which is of simple and rugged design. The tray assembly includes a tray guide mounted on the housing and on which the tray can slide. A spring coupled to the tray urges it rearwardly towards the deployed position. A double click mechanism is provided that includes a cam element and a follower element, one mounted on the tray and the other on the tray guide. The double click mechanism latches the tray in the stowed position until it is pushed forward slightly, when it is released to move rearwardly to the deployed position. The tray and tray guide are each molded polymer parts, with one of the elements of the click mechanism molded integrally with the tray and the other element molded integrally with the tray guide. This minimizes the number of parts to be made and mounted.

The tray has a groove that forms the cam follower. The tray guide includes a largely U-shaped part with a base and a pair of legs extending rearwardly from the base, with the tray slideably mounted between the two legs. The cam follower is formed by a resilient arm extending rearwardly from the base of the tray guide and having a cam follower part at its rear end which is engaged in the groove of the cam.

The tray has a forwardly-projecting spring arm. A tension spring has a front end mounted on the front end of the spring arm, and has a spring rear end mounted on the rear end of a leg of the tray guide. The use of a tension spring avoids the problem of column collapse of a compression spring. The tension spring lies in a confined area between a side of the tray guide and a side of the housing of the electronic device.

An electronic connecting arrangement that connects the component on a moving tray to a mother board on the stationary housing, includes a flat flexible cable having upper and lower cable parts lying in horizontal planes and connected by a 180° bend.

The novel features of the invention are set forth with particularity in the appended claims. The invention will be best understood from the following description when read in conjunction with the accompanying drawings.

BRIEF DESCRIPTION OF THE DRAWINGS

FIG. 1 is a rear and top isometric view of an electronic device of the invention, with the top cover portion removed, and with the tray in a deployed position.

FIG. 2 is a view similar to that of FIG. 1, but with the tray in a stowed position.

FIG. 3 is an exploded isometric view of the electronic device of FIGS. 1 and 2, including the top cover portion.

FIG. 6 is an exploded isometric view of the tray assembly of FIG. 4, but without the spring.

FIG. 7 is an upside-down exploded isometric view of the tray assembly of FIG. 6.

FIG. 8 is a partial sectional view taken on line 8—8 of FIG. 4.

FIG. 9 is an enlarged view of a portion of the upside-down view of FIG. 7, showing the cam element of the double click mechanism thereof.

DESCRIPTION OF THE PREFERRED EMBODIMENTS

Figure 4:
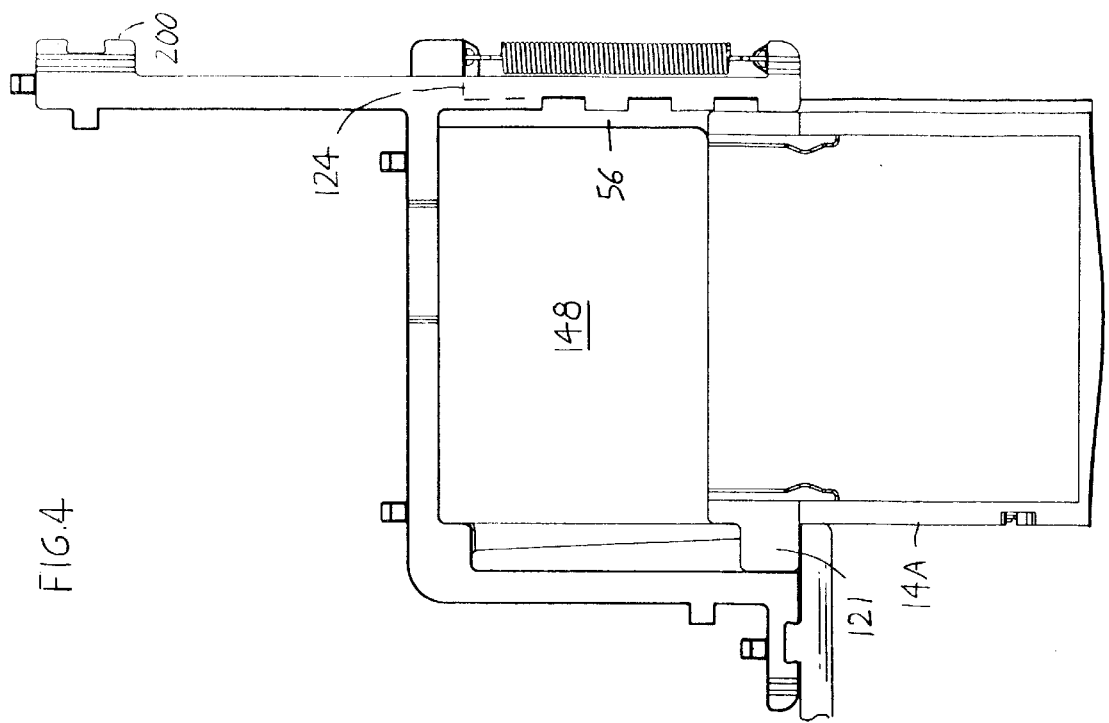
FIG. 4 is a plan view of the tray assembly of FIG. 1 in its deployed position.

FIG. 1 illustrates an electronic device 10 which is a Type II IC card constructed in accordance with PCMCIA (Personal Computer Memory Card International Association standards) which specifies a maximum height in vertical directions U, D of 5 mm. The IC card has a tray assembly 12 with a tray 14 that can slide along a slot 16, between the deployed position shown at 14 in FIG. 1, and the stowed position shown at 14A in FIG. 2. In the deployed position of FIG. 1, an electronic component 20 which is a fingerprint sensor that lies on a rear portion of the tray, is exposed. A person lays his/her finger on the sensor which senses the person's fingerprint characteristics. The output of the fingerprint sensor component 20 is delivered through an electrical connector arrangement 22 to a mother board 24 that is fixed to a housing 26 of the electronic device. The housing has front and rear ends 27, 28 spaced in longitudinal directions M and has laterally L opposite sides 146. For an IC card electronic device, signals from the fingerprint sensor component 20 are delivered (or processed data based on it is delivered) through a front connector 30 to another electronic device such as a computer.

When the tray is in the stowed position 14A of FIG. 2, the tray can be moved to the deployed position by a person pushing forwardly against a rear surface 32 of the tray. A double click mechanism 34 then releases the tray so it can slide rearward, and a tension spring 36 moves the tray rearward to the deployed position.

FIG. 3 shows that the electronic device includes top and bottom cover portions 40, 42 that form much of the housing 26. The mother board 24, which has top and bottom surfaces 44, 46, lies on the bottom cover portion and is fixed in place thereon. It is noted that in the particular device illustrated, the bottom cover portion has an opening 51 for receiving a SIM smart card 53, and that a connector 55 mounted on the mother board has contacts that engage pads 57 on the SIM card. A computer that receives the IC card electronic device 10 can be programmed to authorize usage if there is high correspondence between the fingerprint of the person and a stored fingerprint code, and also allow authorization if there is a lower correspondence but the person has a proper SIM card 53.

A tray guide 50 is mounted in the housing, to provide much of the guiding of the tray, and to perform other functions. The tray guide includes a largely U-shaped holder 52 with a base 54 and with a pair of legs 56, 58 extending rearwardly R from opposite sides of the base. The tray 14 has opposite sides that fit between the legs 56, 58 of the holder.

FIGS. 6 and 7 show that the double click mechanism includes a cam element 70 and a cam follower element 72. The cam element is well known, and as shown in FIG. 9, includes a groove 74 and a divider 76 that divides the groove into two diverging portions 80, 82 and a rear connecting groove portion 84. The cam follower includes a follower part 90 in the form of a pin that rides along the groove 74. The first time that the tray 14 is pushed forward by pushing against the cam and tray rear surface 32, the follower part 90 moves along one of the groove parts 82. When the tray is no longer pushed forward, the spring holds the follower part against a surface 92. A second forward push against the cam rear surface 32 results in the follower part 90 being diverted to the other groove part 80, while allowing the tray to move a considerable distance such as 2 centimeters (cm) rearward R to its deployed position.

The cam follower element 70 is formed by molding it into a side 100 of the tray. FIG. 6 shows that the cam element 72, whose follower part 90 must move up and down, is formed by a longitudinally M elongated and vertically resilient beam. The beam of the cam follower element has a front end 102 molded integrally with the rest of the tray guide, near an intersection of the leg 58 with the base 54. By forming the follower element 72 as an integral part of the tray guide, applicant avoids the need for a separate follower element and for means for pivotally mounting the follower element on the housing or tray guide.

Figure 5:
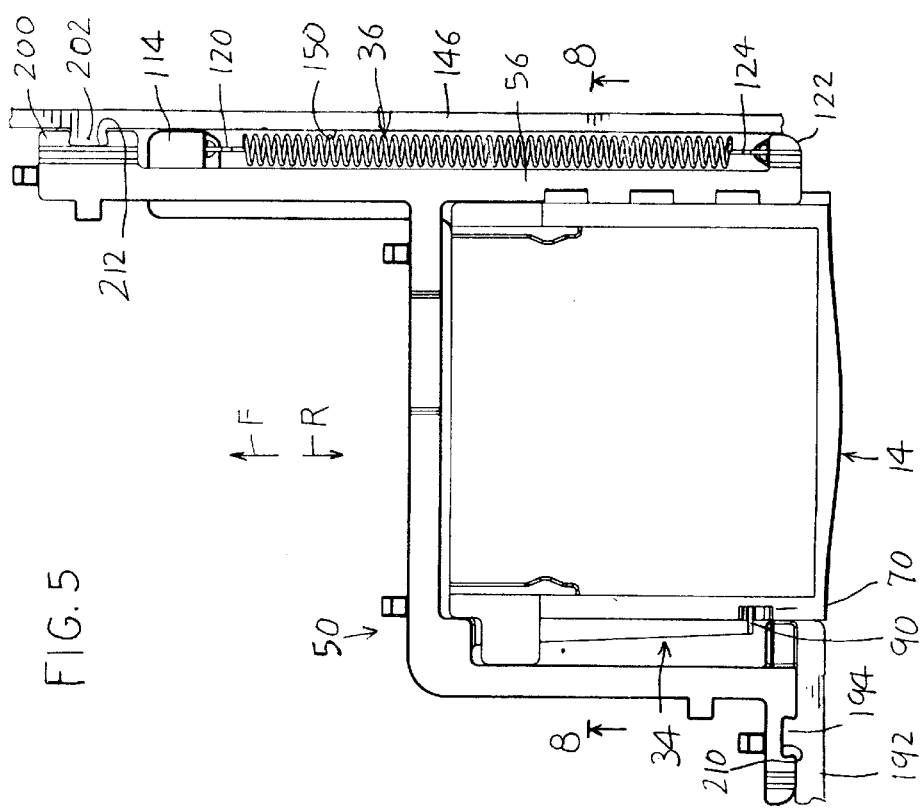
FIG. 5 is a view similar to that of FIG. 4, showing a first side of the housing and showing the tray assembly in the stowed position.

FIG. 3 shows that the tray 14 has a second side 110, and has a forwardly-projecting arm 112 that projects forwardly from the side 110 of the tray. The arm 112 has a front end forming a front spring mount 114. The tension spring 36 has a front end 120 that is attached to the front spring mount. The tray guide 50 has a rear spring mount 122 at the rear end of its leg 56, and the spring has a rear end 124 that mounts on the rear spring mount 122. FIG. 5 shows the spring 36 fully expanded in length and held between the spring mount 114 on the tray and the spring mount 122 on the tray guide. The spring tends to pull the tray 14 rearward R, but the engagement of the cam follower part 90 with the cam element 70 prevents such forward movement until the tray is pushed inward slightly, as by about 1 mm. After the tray has been pushed forward slightly, so the double click mechanism 34 has released the tray to move rearward, the tray moves rearward to the deployed position 14A of FIG. 4. As shown in FIG. 1, when the tray reaches its deployed position, projections 121 at the front end of the tray abut a rear wall 192 of the housing. At the same time, the spring mount 114 (FIG. 7, which is upside-down) on the tray abuts another stop 124.

FIG. 6 shows that the tray guide 50 has a forwardly-projecting arm-guide leg 128 with a slot or passage 130, and that the spring mount 114 at the front of the spring arm 112 projects laterally L through the passage to project laterally from the right leg 56. The passage 130 helps to closely guide the spring arm 112 to prevent up or down deflection of the spring mount 114 under the tension force of the spring. The spring holder arm 112 is wider in a lateral direction than its thickness in a vertical direction, so guidance by the walls of the passage 130 in the leg 128 is especially useful.

The top and bottom cover portions shown in FIG. 3 at 40 and 42, each includes a sheet metal portion 140, 142 and plastic side beams 144, 145 at opposite sides of each portion, with the side beams 144, 145 being sonically welded together to close the cover around the mother board and other parts. As shown in FIG. 5, the side 146 of the housing is spaced from the tray guide first or rightmost leg 56 by a distance that is slightly wider than the diameter of the tension spring 36. As a result, the spring lies in an isolated area 150 between a housing side wall and a tray guide leg 56. The isolated area lies on a side of the tray leg 56 opposite the space 148 that receives the tray. Since the spring is a moving part that can vibrate and that has numerous spring turns that can rub or catch against other parts, the confining to an isolated area, avoids damage to or from the spring.

FIG. 3 shows that the fingerprint sensor component 20 is mounted on a daughter board 160, and that a ribbon or flexible cable connector 162 is mounted on the daughter board. Another flexible cable connector 164 is mounted on the mother board. A ribbon cable or flat flexible cable 166 extends between the two connectors 162, 164. The flat flexible cable 166 has upper and lower cable parts 170, 172 that each lies in substantially a horizontal plane (that is normal to the vertical directions U, D) and that are connected by a substantially 180° bend 174. As shown in FIGS. 1 and 2, the bent cable portion is bent about a horizontal axis 176 that extends laterally L. When the tray is deployed, the upper cable part 170 grows in length while the lower cable part shortens in length, but they always remain largely planar. The flat flexible cable has very thin conductors, so the bend 174 can have a small height such as 2 mm without being permanently deformed. If the bottom cover portion does not have a slot for receiving a SIM card, a slot indicated at 180 can be formed in the mother board to provide for a larger radius of curvature at the bend 174. It is noted that for a fingerprint component 20, the component has numerous surface mount contacts at its lower end that are soldered to traces on the daughter board 160, with the traces extending to the daughter board cable connector 162.

FIG. 3 shows that the base 54 of the tray guide has a slot 184 through which the flat flexible cable extends. This allows the rest of the base to extend up against the sheet metal portion 140 of the top cover portion for maximum thickness of the tray guide (except at the slot) and to help support the sheet metal portion.

The tray guide 50 is preferably mounted directly to the housing 26 of the electronic device. The tray guide has a rear end that includes a lateral side extension 190 (FIG. 1) that extends the tray rear end across the entire width of the device between its housing opposite sides 146, thereby trapping the rear of the tray guide. A separate rear wall 192 of the housing has a lug 194 that fits into a corresponding recess at the extension 190 on the tray guide, and these parts can be locked together. Similarly, the forwardly-elongated arm guide leg 56 of the tray guide has an extension 200 that receives a lug 202 projecting inwardly from the housing side 146. FIG. 5 shows that the slots 210, 212 are slightly undercut and the lugs have corresponding enlarged ends. This allows the lugs 194, 202 to lock to the housing by merely pressing down the tray guide into the bottom cover portion.

The electronic device 10 shown in FIG. 1 is assembled by first assembling the tray 14 to the tray guide 50 and then moving the tray guide down into the bottom cover portion 42 until the tray guide locks to the lugs 194, 202. Then, the mother board 24 is slid rearwardly into place around the tray guide. The flat flexible cable 166 will already have been attached to one of the connectors such as the one on the mother board, and is then attached to the other connector such as the one 162 on the daughter board. The forward connector 164 may already be soldered to the mother board and settles into place as the mother board is installed. Finally, the top cover portion 40 is placed over the bottom cover portion and the plastic parts at the sides 144, 146 and at portions of the front and rear ends are ultrasonically welded together.

FIG. 8 shows that the tray 14 is guided against vertical movement by the sheet metal walls 140, 142 of the top and bottom cover portions that engage opposite sides 100, 110 of the tray. The right side 110 of the tray is guided in a tongue 220 and groove 222 sliding connection. The left side is guided only by abutment of the tray left side 100 at projections 121 that lie above and below the cam follower element 72. A tongue-and-groove joint cannot be readily provided on the left side because of the follower element 72. The tongue-and-groove connection at the right side 110 of the tray helps prevent the tray from deflecting downward in its deployed position.

While terms such as "upper", "lower", etc. have been used to describe the invention as it is illustrated, it should be understood that the electronic device and its parts can be used in any orientation with respect to the Earth. Also, the tray can extend from any wall of the electronic device, which wall can be considered to be a rear part.

Thus, the invention provides an electronic device with a tray assembly that includes a tray that can move rearward and forward between a stowed position and a deployed position, in an easily installed, easily operated, and rugged construction. The tray assembly includes a spring that urges the tray rearwardly towards its deployed position, and a double click mechanism that latches the tray in the stowed position while releasing it when the tray is pushed forward slightly. The double click mechanism includes a cam element and a cam follower element in the form of an elongated beam that can deflect, where one element is formed integrally with a polymer tray and the other element is formed integrally with a polymer molded tray guide that guides the tray in sliding movement. The spring that urges the tray rearward is a tension spring with a spring forward end connected to a forwardly-projecting arm on the tray, and with a spring rear end mounted on the tray guide. The spring can be enclosed in an isolated area lying between one side of the housing and a side of the tray guide. A daughter board on the tray is connected to a mother board lying in a fixed position on the housing, by a flat flexible cable with horizontal upper and lower cable portions that are connected by a substantially 180° bend in the cable. Instead, contacts on the underside of the daughterboard could slide into engagement with contacts of a connector on the motherboard. The tray guide can be mounted by forming it with laterally spaced undercut slots that closely receive lugs formed in plastic beams of the housing.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. An electronic device that includes a mother board having top and bottom surfaces and front and rear ends, and a housing which includes top and bottom cover portions that lie respectively above and below said mother board and that are mechanically connected to said mother board, said housing having longitudinally-spaced front and rear ends and laterally spaced opposite sides, comprising:

a tray guide mounted on said housing;

a tray which is moveably mounted on said tray guide so said tray can move forward and rearward between a stowed position and a deployed position;

an electronic component mounted on said tray, with said component lying rearward of said housing rear end in said deployed position of said tray and lying within said housing in said stowed position of said tray;

a connecting arrangement that electronically couples said tray to said mother board at least when said tray is in said deployed position;

a spring that is coupled to said tray and that urges said tray rearwardly toward said deployed position;

a double click mechanism that includes a cam element and a follower element, which latches said tray in said stowed position when said tray is pushed forward from said deployed position to said stowed position and which releases said tray from said stowed position when said tray is pushed slightly forward therefrom, said double clock mechanism including a cam element and a follower element where one element is mounted on said tray and the other is mounted on said tray guide;

said tray and said tray guide are each molded polymer parts, with one of said elements of said click mechanism molded integrally with said tray and the other element of said click mechanism molded integrally with said tray guide.

2. The device described in claim 1 wherein:

said tray guide includes a largely U-shaped part with a base having laterally opposite sides and a pair of legs extending rearwardly from said opposite sides, and with said follower element being in the form of a bendable beam having a front end merging with said U-shaped part at a location near the intersection of the front end of a second one of said legs and said base, with follower element extending rearwardly from said location and having a rear end with a laterally extending follower part that engages said cam element;

said tray has opposite sides with a second of said sides having a groove that forms cam element, with said follower part of said follower element projecting into said groove.

3. The device described in claim 1 wherein:

said tray guide has laterally opposite sides and has a spring mount at one of said sides;

said tray has a component holder with laterally opposite sides, and has a spring holder arm that extends forwardly from one of said component holder sides and that has a holder arm front end;

a tension spring having a front end mounted on said holder arm front end, said spring having a rear end mounted on said spring mount.

4. The device described in claim 1 wherein:

said connecting arrangement includes a flat flexible cable having upper and lower cable parts that each lies substantially in a horizontal plane, with said upper and lower cable parts joined by a substantially 180° bend in said cable about a laterally-extending axis, and with one of said cable parts connected to said tray to connect to said component and with the other of said cable parts connected to said mother board.

5. The device described in claim 1 wherein:

said tray guide has laterally-spaced locations with projecting lugs, and said housing has a pair of slots that each receives one of said lugs, with said slots being undercut and said lugs matching said slots to lock to said housing at said locations.

6. The device described in claim 2 wherein:

said tray has a first side lying opposite said second side and forming a first one of said legs with a longitudinally extending slot having top and bottom slot walls that lie closely above and below said tray second side to form a tongue-and-groove sliding connection at said first side of said tray.

7. The device described in claim 2 wherein:

said tray guide has a second side with a second of said legs lying at said tray guide second side;

said tray has top and bottom projections that extend respectively above and below said beam formed by said follower element and that slideably engage said second leg of said tray guide.

8. The device described in claim 4 wherein:

said tray guide has a largely U-shaped part with longitudinally extending legs having leg front ends and a base connecting said leg front ends;

said base has a slot and said cable extends through said slot.

9. An electronic device that includes a mother board having top and bottom surface and front and rear ends, and a housing which includes top and bottom cover portions that lie respectively above and below said mother board, said housing having longitudinally-spaced front and rear ends and laterally opposite sides, comprising:

a tray guide mounted on said housing and having a tray-receiving space and a first leg on one side of said space;

a tray which is slideably mounted on said tray guide to slide in said space, in forward and rearward directions between a stowed position and a deployed position;

said tray has a forwardly-projecting arm with a front end forming a front spring mount lying on a side of said first leg of said tray guide that is opposite said tray-receiving space;

said first leg of said tray guide has a rear spring mount lying directly rearward of said front spring mount;

a tension spring having a front end mounted on said front spring mount of said tray arm, and having a rear end mounted on said rear spring mount.

10. The device described in claim 9 wherein:

said tray guide has an arm-guide leg projecting forwardly from said first leg, with said tray guide having a longitudinally-extending passage;

said first spring mount on said forwardly-projecting arm of said tray, projects laterally through said passage.

11. The device described in claim 9 wherein:

said housing has laterally opposite sides, and said spring lies between said tray guide first leg and a first of said sides of said housing, and said spring is vertically enclosed between said top and bottom cover portions.

12. The device described in claim 11 including:

a tray guide mounted on said housing, with said tray slideably mounted on said tray guide, said tray guide including a U-shaped part with a base and laterally opposite legs that extend rearwardly from said base, with said base having an upper end with a slot and with said upper cable part extending through said slot.

13. An electronic device that includes a mother board having top and bottom surfaces and front and rear ends, and a housing which includes top and bottom cover parts that lie respectively above and below said mother board, said housing having front and rear ends and laterally spaced opposite sides, comprising:

a tray which is moveably mounted in said card housing to move forward and rearward respectively between a stowed position and a deployed position;

an electronic component mounted on said tray with said component lying rearward of said housing rear end in said deployed position of said tray and lying within said housing in said stowed position of said tray;

a connecting arrangement that electronically couples said component to said mother board at least when said tray is in said deployed position;

said connecting arrangement includes a flat flexible cable having upper and lower cable parts that each lies substantially in a horizontal plane, with said upper and lower cable parts joined by a substantially 180° bend in said cable about a laterally-extending axis, and with one of said cable parts connected to said tray to connect to said component and with the other of said cable parts connected to said mother board.

14. The device described in claim 13 including:

a tray guide mounted on said housing, with said tray slideably mounted on said tray guide;

a tray cable connector mounted on said tray and a board cable connector mounted on said mother board, with said upper cable part having a rear end connected to said tray connector and with said lower cable part having a rear end connected to said board connector, and with said 180° bend lying forward of both of said connectors.

15. An electronic device that includes a mother board having top and bottom surfaces and front and rear ends, and a housing which includes top and bottom cover portions that lie respectively above and below said mother board and that are mechanically connected to said mother board, said card housing having longitudinally-spaced front and rear end walls and laterally spaced opposite side walls, comprising:

a tray guide mounted on said housing;

a tray which is moveably mounted on said tray guide so said tray can move forward and rearward between a stowed position and a deployed position;

an electronic component mounted on said tray, with said component lying rearward of said housing rear end in said deployed position of said tray and lying within said housing in said stowed position of said tray;

a connecting arrangement that electronically couples said tray to said mother board at least when said tray is in said deployed position;

said housing has at least a pair of laterally-spaced lugs that each projects into said housing from one of said walls of said housing;

said tray guide has opposite sides, with each side having a slot that closely receives one of said lugs, with each slot being undercut and each lug having a corresponding shape to lock to the slot.

* * * * *